United States Patent [19]
Ross

[11] 3,909,178
[45] Sept. 30, 1975

[54] MOLD FOR MAKING FLUID CONTAINING STRUCTURE
[76] Inventor: Benjamin Ross, 300 N. State St., Chicago, Ill. 60610
[22] Filed: May 20, 1974
[21] Appl. No.: 471,344

Related U.S. Application Data
[62] Division of Ser. No. 194,887, Nov. 2, 1971, Pat. No. 3,849,814.

[52] U.S. Cl. .................. 425/425; 29/463; 249/117; 425/435
[51] Int. Cl.² .. B29C 5/04; B29H 3/00; B21D 39/02
[58] Field of Search ............ 425/435, 425; 249/117, 249/137, 168; 264/45, 219; 5/348 WB; 29/463, 481

[56] References Cited
UNITED STATES PATENTS
1,491,846   4/1924   Coates ............................ 249/137 X
1,602,394   10/1926  Dean ............................. 249/137 X
3,192,568   7/1965   Nicholls ......................... 249/137 X
3,568,272   3/1971   Zmania ........................... 425/435 X Primary Examiner—Francis S. Husar
Assistant Examiner—John S. Brown
Attorney, Agent, or Firm—Laff, Whitesel & Rockman

[57] ABSTRACT

A molded article capable of floatably supporting a human body, which comprises a seamless fluid-containing structure having a predetermined shape, and a supporting framework or the like to laterally support the structure so that one surface of it may be used as a floatable support, said article being manufactured by a mold and molding process wherein said mold has a small hatch or other small opening for providing access to the mold interior. Said mold is rotated and heated at predetermined rates and under predetermined conditions until said mold interior is evenly coated with plastic, the plastic is thereafter cured, and the finished product is then removed from the mold through the hatch.

10 Claims, 14 Drawing Figures

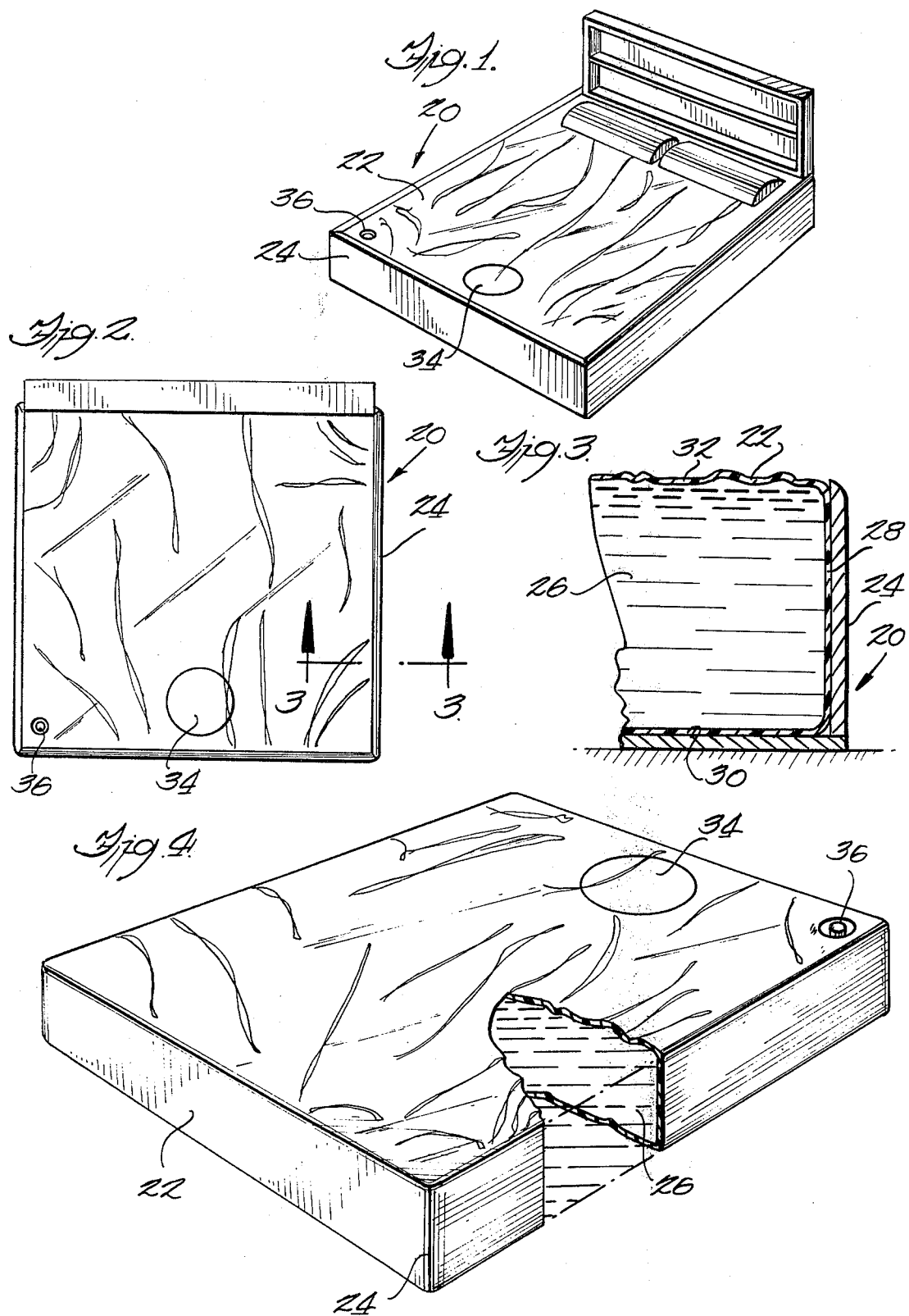

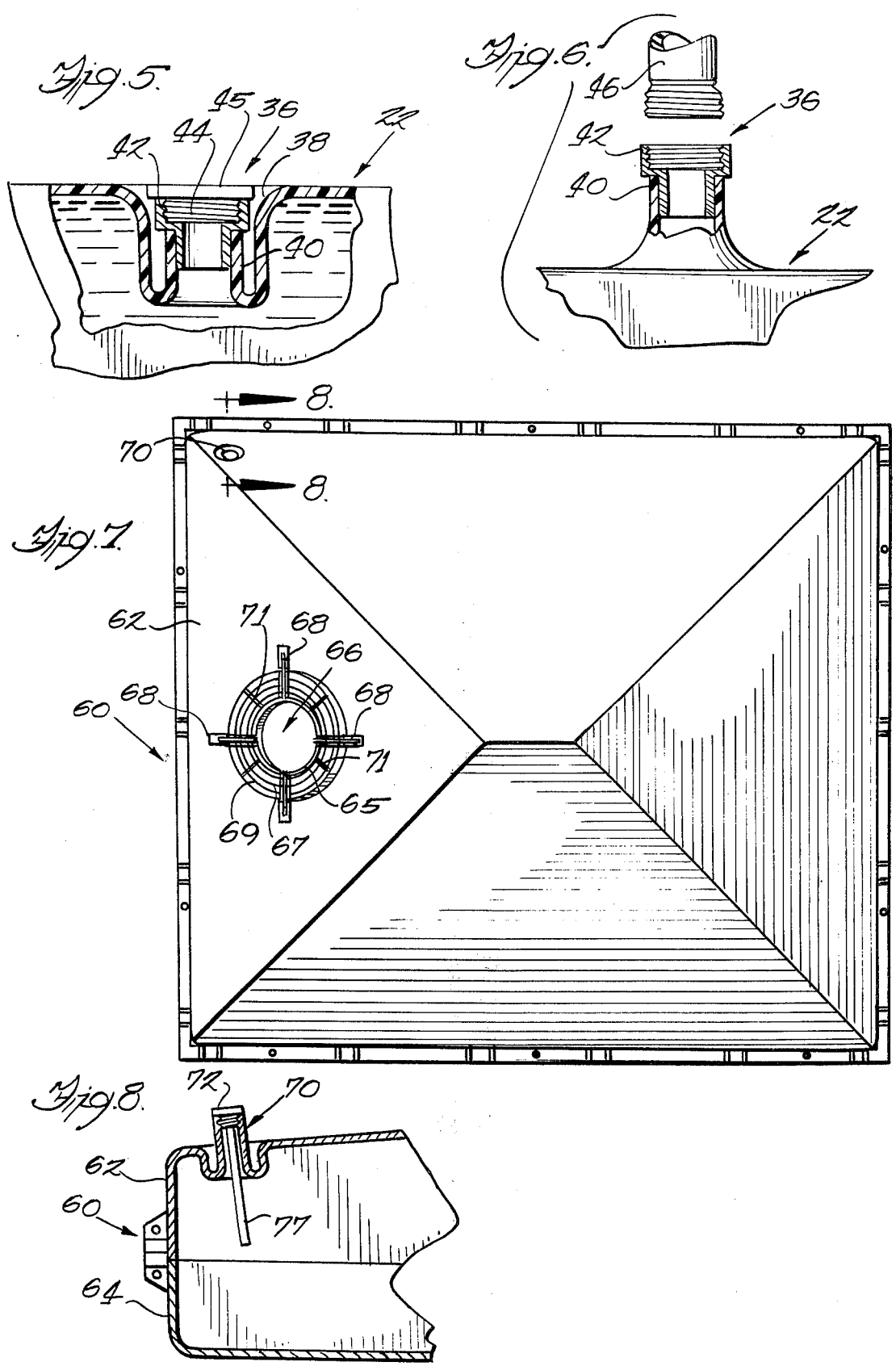

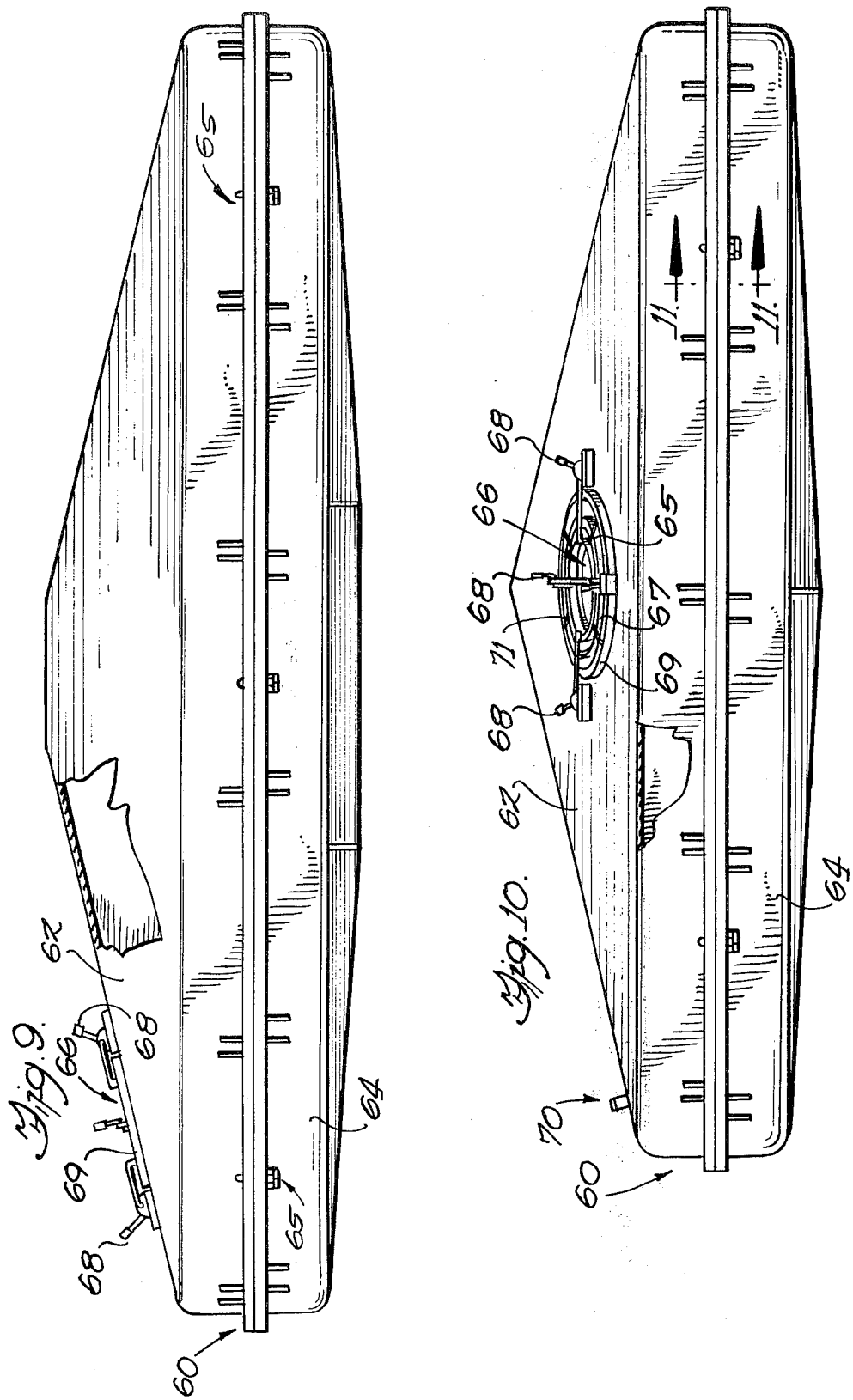

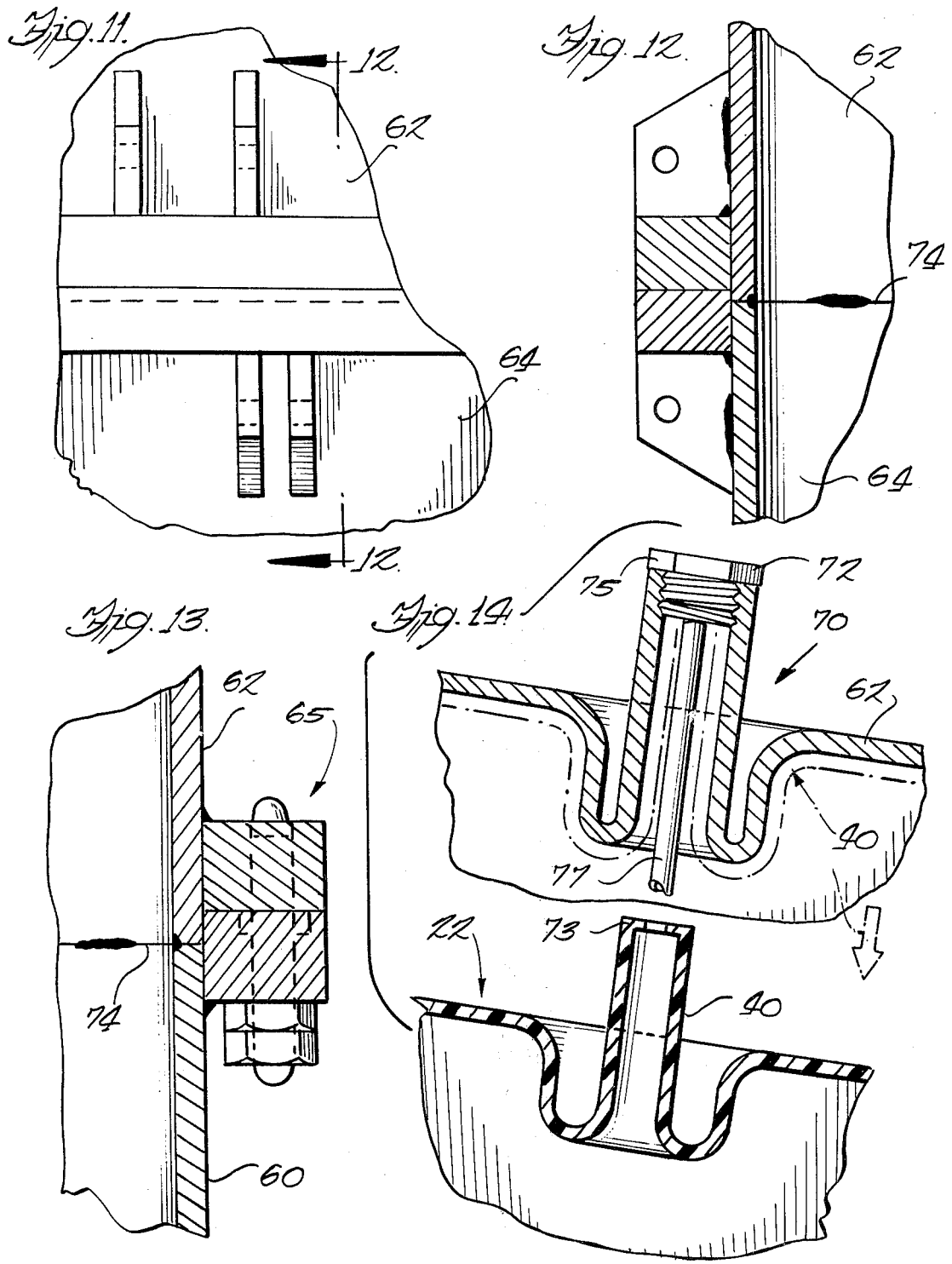

MOLD FOR MAKING FLUID CONTAINING STRUCTURE

This is a division of application Ser. No. 194,887, filed Nov. 2, 1971, now U.S. Pat. No. 3,849,814.

BACKGROUND OF THE INVENTION

This invention relates to an article of furniture, and in particular, to a device for floatably supporting a human body, such as a water bed or water mattress, chair, sofa, or other device incorporating a fluid-containing structure for supporting a human body. It also relates to a mold and process for making such an article.

The water bed was originally developed as a specialized hospital device. Recently, a sealed vinyl plastic bladder to contain the water was developed which eliminated the need for the conventional tanks or pools previously used and made such water-filled devices practical for use in the average household. This vinyl bladder was combined with supporting framework to form a water bed, and is described in U.S. Pat. No. 3,585,356.

The sealed vinyl bladder, however, did not solve an essential problem of water bed construction: total reliability in the containment of the water mass. Water, or any other liquid which could provide flotation and the hydraulic characteristics necessary for water bed construction, represents a destructive substance in the environment of the home. Thus, to be acceptable for widespread use by the public, the containing structure for the water or other liquid must provide virtually 100% reliability.

To date, fluid-filled vinyl mattresses have been fabricated from sheet materials, most commonly, sheets of polyvinyl chloride, ranging from 12 mils to 25 mils in thickness. While the vinyl sheet material has itself been largely effective, the methods used to seal the edges of the vinyl sheets have not been. Heat sealing, which is the method most often used to seal the edges of the vinyl sheets, has inherent problems. For example, the sealing process creates a "bead" at the juncture of the edges, which, if malformed may cause undetectable weak spots and result in the failure of the water mattress.

Weaknesses in the seams of the water mattresses may also be caused by such variables as sealing speed, temperature, and pressure, or by the destruction of certain physical properties of the polyvinyl chloride sheet during the heat-sealing process. The heat generated by the sealing instrument may drive plasticizing additives out of the polyvinyl chloride, causing a brittle area alongside the seam, which has a significantly lower tolerance to pressure and flex, and a consequent tendency to form "runs" or openings. This type of failure of the water-containing structure is particularly destructive since it may release up to 200 gallons of water in a matter of a few seconds.

To achieve better seals on the vinyl bladders, a heat-sealed overlap seam was used, which added greater structural strength to the seam, but retained the other faults resulting from the heat-sealing process used. Another type of improved seam was an overlap seam which was glued together. While this method provides high reliability, it is highly complicated and prohibitively expensive for widespread use.

Another disadvantage of the bladder type sealed mattresses is the fact that they have no predetermined shape. They therefore do not fit well within the supporting frames used with them and tend to roll off at the sides, creating an uneven sleeping surface.

Other disadvantages of the mattress to date are the difficulty in controlling firmness and the inadequacy of the valve employed for filling the mattresses with water. Often the valve has protruded from the surface, causing discomfort to persons using mattresses, and many of the valves have leaked after the mattresses were filled with water.

Therefore, it is one object of this invention to provide a liquid-containing structure which does not have the inherent problems of seam fabrication. It is a further object of this invention to provide a liquid-containing structure which is comprised of an essentially single continuous form having no seams.

It is a further object of this invention to provide a liquid-containing structure which has a predetermined shape. It is a further object of this invention to provide a water mattress which, when filled, has generally vertical sides which rest generally flat against the sides of a supporting frame or structure, providing a smooth and neat appearance, a complete transfer of weight and stress from the mattress walls to the frame, a more even sleeping surface, and improved means for holding the bedding in place when tucked between the mattress and frame.

It is still another object of this invention to provide a water mattress or other liquid-containing structure in which the firmness can be controlled by the amount of material on the upper surface of the mattress.

It is another object to provide a seamless water-containing structure which is durable and economical to manufacture.

It is a further object of this invention to provide a new process for manufacturing a water-containing structure having no seams, and a novel mold for molding a water-containing structure having no seams.

Additional objects will become manifest from the accompanying description, the drawings, and the claims.

SUMMARY OF THE INVENTION

The invention in one form comprises a seamless fluid-containing structure having a predetermined shape. The structure has a generally cubic shape and is designed to precisely fill a frame, preferably a rectangular frame. The bottom of the structure will be the same size as the frame bottom. The sides of the structure are essentially vertical and the corners formed by the sides and the bottom of the structure are curved. The surface of the structure has excess material to allow contouring of the structure without drawing in the sides. Firmness of the structure is controlled by the amount of this excess material, rather than by the amount of water which is included within the structure. A valve is provided for filling and draining the fluid. The valve is adapted to be recessed in the upper surface of the structure so that it does not protrude above the surface.

The structure is formed by a process called rotational molding. In this process, liquid or pelletized plastic material is placed inside a mold and the mold is simultaneously heated and rotated about two axes until the internal surface of the mold is completely coated with plastic material. Thereafter, the mold is further heated until the plastic is cured and the completed structure is removed from the mold through a porthole or hatch. The mold is constructed in two sections which are permanently sealed together. Access to the interior of the mold is secured through the hatch. The parting line between the two mold sections is welded together and the weld is ground smooth so that there is no protruding surfaces on the inside of the mold. The mold is provided with a domed portion which enables a person to enter the mold and accomplish the aforementioned welding operation. The domed portion also produces the excess material at the upper surface of the mattress.

BRIEF DESCRIPTION OF THE DRAWINGS

FIG. 1 is a perspective view of a water bed including a fluid-containing structure made in accordance with this invention.

FIG. 2 is a top plan view of FIG. 1.

FIG. 3 is an enlarged partial sectional view taken along line 3—3 of FIG. 2.

FIG. 4 is an enlarged perspective view of the fluid-containing structure shown in FIG. 1.

FIG. 5 is an enlarged partial sectional view showing the valve for filling the fluid-containing structure in its recessed closed condition.

FIG. 6 is an enlarged partial view, showing the valve of FIG. 5 in its raised open condition and showing the manner in which it connects to a water source.

FIG. 7 is a top plan view of a mold embodying the invention.

FIG. 8 is an enlarged partial sectional view taken along line 8—8 of FIG. 7.

FIG. 9 is a front view of the mold shown in FIG. 7, with a portion cut away and shown in cross section.

FIG. 10 is a side view of the mold shown in FIG. 7 with a portion cut away and shown in cross section.

FIG. 11 is an enlarged partial sectional view taken along lines 11—11 of FIG. 10.

FIG. 12 is an enlarged partial sectional view taken along lines 12—12 of FIG. 11.

FIG. 13 is an enlarged sectional view showing the manner in which the mold parts are bolted together.

FIG. 14 is an exploded view showing the formation of the valve portion of the mattress in the mold and after the mattress is removed therefrom.

DESCRIPTION OF THE PREFERRED EMBODIMENTS

Referring to the drawings and particularly to FIG. 1, a water bed 20 is provided having a fluid-containing mattress 22 and a frame 24. The frame may be constructed of wood or other suitable rigid material. The mattress 22 is preferably constructed of a high molecular weight vinyl plastic. The thickness of the mattress walls should be sufficient to make the mattress generally puncture resistant. Such results may be accomplished with a thickness of about 35 mils for the walls and approximately 45 mils at the corners. The material is translucent so that air bubbles can be readily detected and removed after the mattress is filled with water. The vinyl should have high tear strength, such as about 170 to 200 psi, should have high tensile strength, ranging, for example, from about 1350 to 1800 pounds per square inch, should be highly flexible at room temperature, should not stretch when it is deformed or flexed, and preferably should be able to withstand exposure to anti-bacterial and anti-algai additives. The mattress 22 should be able to withstand continuous exposure at temperatures up to at least 110°F., and preferably should remain non-brittle at temperatures as low as −10°F.

The mattress 22 has a predetermined cubic shape so that it conforms to, and fills, the rectangular frame 24. The mattress has no seams because, as will hereinafter be described, it is molded into a predetermined shape, rather than manufactured from sheets and sealed. As shown in FIG. 3, the mattress 22 is filled with water 26, or other suitable fluid, and the sides 28 of the fluid-filled mattress 22 fit snugly against the side of the frame 24. The bottom 30 of the mattress 22 rests on the bottom of the frame and the corners formed by the sides and bottom of the mattress are generally arcuate-shaped. The top 32 of the mattress 22 is provided with excess material so that the sides will not be drawn inward when the mattress is filled with liquid and is supporting a load, a problem which exists when sealed bladders are used as a mattress. This feature and the fact that the mattress has a given shape allows the mattress to fit precisely within a frame. The vinyl bladder type mattresses do not have a predetermined shape and thus are squeezed within frames, which prevents satisfactory control of firmness. In the present invention, the firmness of the mattress 22 is controlled by the amount of excess material on the top 32. Thus, the water level is generally always the same. A conventional heater, not shown, may be used to warm and maintain the water 26 at an elevated temperature.

The frame acts not only to contain the mattress 22, but also can provide additional protection against water spillage. The frame may be made watertight by lining it with a watertight plastic sheet so that if the mattress were to leak, the water would still be contained within the frame. In order to serve the latter purpose, the depth of the water in the mattress should not exceed the height of the frame. Otherwise, if the mattress were punctured, water would spill over the edge of the frame. The ideal depth of the water should be the actual height of the frame, for if the latter exceeds the depth of the water in the mattress by too great an amount, it would cause the user to have difficulty in reaching and leaving the sleeping surface of the mattress. Since the water level is usually maintained at its ideal depth, the level will remain substantially the same for any given mattress, i.e., the same height as the frame. Firmness of the mattress is therefore not controlled by varying the quantity of water therein. Rather, as noted earlier, firmness in the present invention is controlled by regulating the amount of excess material in the mattress surface. In general, the amount of excess material should vary from about two inches of excess in both length and width for a frim surface to about six inches of excess in each dimension for a very soft surface. Since good support in a water bed depends on the contour of the surface, it should be as soft as is feasible without being so slack that the person supported thereby rests on the bottom of the mattress.

As we shall hereinafter show, the excess material is included in the mattress surface by providing a dome in the mold. The amount of excess material in the mattress is varied by variations in the shape of the dome, particularly variations in the height thereof.

A ridge of plastic material 34 is formed on the mattress surface by a hatch provided in the mold for removing the molded structure, all of which will be hereinafter described. This ridge is small, does not affect the quality of the mattress, and can be covered by a label or the like when the mattress is offered for sale.

Referring to FIGS. 1, 2 and 4, valve means 36 are provided on the top surface 32 of the mattress 22 for filling and draining the mattress 22. When the mattress is filled and in use, the valve means 36 is recessed so that it does not protrude above the surface of the mattress. In this way, the valve means does not interfere with a person lying on the mattress.

FIGS. 5 and 6 show the valve means 36 in detail. A recess or well 38 is formed in the mattress surface, generally at a corner of the foot of the mattress. A small tubular neck 40 extends upward about 3 inches from the bottom of the well. Only a small space exists between the wall of the neck 40 and the outer wall defining the well 38. The neck is approximately three-fourth inch in diameter, although any suitable size may be employed. A fitting 42 is glued or otherwise fastened inside the tubular neck 40. If desired, a fitting could be fastened to the outside of the neck 40 in lieu of the assembly shown. The fitting is preferably threaded and adapted to receive a threaded cap or stopper 44 which forms a watertight closure. The top 45 of the cap may be constructed of plastic and should not extend above the surface of the mattress 22. A conventional female garden hose coupler may be used as the fitting 42. To fill the mattress 22, the neck 40 is pulled upward (FIG. 6), the cap 44 is removed, and a hose 45 (FIG. 6) is threadably connected to the fitting 42. The hose, which may be an ordinary garden hose, is connected to a water source, such as a sink faucet, and the mattress is filled.

The ability of the neck 40 to be pulled upward aides draining, as well as filling, and reduces the opportunity for water spillage because the opening is above the water level. This design of the valve means 36 is especially helpful in bleeding air bubbles from the mattress—a procedure necessary to achieve proper surface characteristics and to stop the sloshing noise which may irritate a water bed user. After the mattress is filled, the cap 44 is screwed into place, and the valve assembly 36 is snapped back into its recessed position (shown in FIG. 5).

The seamless water mattress 22 of this invention is formed by a process called rotational molding. In this process, liquid or pelletized resinous plastic material is placed inside a mold. The mold is closed, placed on a rotational molding machine, and simultaneously heated and rotated about two different axes, referred to as the major and minor axis, until the internal surface of the mold is coated with molten plastic. As soon as the mold is completely coated, the mold, as it continues to rotate, is further heated, curing the plastic so that it gels. Once the plastic hardens, rotation is ceased, the mold is opened, the molded article is deflated, and the article is removed from the mold.

While rotational molding is well known, objects as large as mattresses, which have a total average weight of about 30 pounds, have not heretofore been molded by this process. To achieve a satisfactory product, several steps have been incorporated in the molding process. Calcium oxide and a silicone base surfactant have been added to the plastic. The former acts to eliminate excess moisture and the latter eliminates air bubbles from the finished product. It has been found that, when using a liquid plastisol, such as high molecular weight liquid polyvinyl chloride having a gel point of about 200°F., the mold should first be rotated at a temperature of 250°F., for approximately three minutes and the temperature of the material should then be increased to 550°F. and maintained there for about 11 minutes until the plastic gels. At these conditions, the mold is preferably rotated about the major axis at about 2½ r.p.m. and about the minor axis at about 11 r.p.m. A rotational speed ratio between the two axes of 1:4 has been found desirable.

FIGS. 7 to 14 illustrate the mold 60 used to manufacture the mattress 22. The mold is preferably constructed of aluminum in sheet form because of its properties of rapid heat transfer, light weight, and relatively low porosity. This allows more precise control of heating and cooling rates and results in greater uniformity of the mattress wall thickness, the absence of drips and runs in the mattress surfaces, and less tendency toward air bubbles in the finished product.

The mold is constructed from two parts 62 and 64 (FIGS. 9 and 10), which are first bolted or clamped, and then permanently welded or otherwise sealed together. The manner in which the two parts 62 and 64 are connected together is shown in detail in FIGS. 11-13. An aligning pin assembly 65, for assuring that the parts are properly aligned for welding, is shown in FIG. 13. The weld is made on the inside of the mold and is ground down so that the interior mold surface at the weld does not protrude and forms a smooth uniform surface with the remainder of the mold interior. Since the purpose of the welding operation is to achieve a smooth and uniform interior surface of the mold, other suitably means may be used to accomplish this end. The mold parts 62 and 64 are permanently sealed together because the size of the mold makes it impractical to clamp and unclamp the mold parts after each operation. Moreover, if the parts 62 and 64 were not welded together and the weld ground smooth in the manner described, a parting line or ridge would be formed about the periphery of the molded plastic article which would be undesirable. While such a parting line would probably not affect the quality of the mattress construction, it would greatly reduce its saleability as a seamless mattress because it would appear to be a seam.

The upper portion 62 of the mold 60 has a domed shape, and a hatch 66 is provided therein. The dome of the upper portion 62 produces the excess material on the sleeping surface of the mattress 22. The height or size of the dome may be increased to provide more excess material and a softer mattress, or the height or size may be decreased to provide less excess material and a firmer mattress. Because the upper and lower parts 62 and 64 are sealed together, the hatch 66 is necessary to provide access to the mold interior for charging raw plastic material into the mold before each operation and for removing the finished article after the process is complete. The hatch 66 is approximately 18 inches in diameter and has a ring 65 made from aluminum bar stock spot welded to it. Two spaced concentric rings 67 and 69, also constructed from aluminum bar stock, are spot welded to the mold and heated in concentric relation to the ring 65. The rings 67 and 69 are held together by an aluminum brace 71. Rings 67 and 69 are spaced to allow heat dissipation and avoid overheating of the mold in the hatch area. The hatch 66, which is removable, is held in place by a plurality of conventional quick-release clamps which are attached to the hatch ring 65 and the mold rings 67 and 69. The clamps 68 act as the means for opening and sealing the hatch.

FIGS. 11 and 12 show brackets 80 for attaching a network of steel tubing, called spidering (not shown), to the mold in order to support the weight of the mold when it is mounted on the rotational molding machine arm and, also, to prevent the mold from flexing during use.

Also provided in the upper portion 62 of the mold 60 is an element or bung 70 for forming the filler tube or neck 40, which forms part of the valve means 36 (see FIGS. 7, 8 and 14). The element 70 is located in one corner of the mold portion 62 and is provided with a venting means 72 for releasing air from the mold during the molding process. The venting means 72 consists of a threaded removable cap 75 and a copper tube 77 centrally located in said cap. The tube extends down and beyond the bottom of the element 70 into the mold. It must have a large enough opening to permit adequate venting and must not contact the walls of element 70 or the filler tube 40 formed therein. While the venting means creates an imperfection in the filler tube, this imperfection occurs in the top portion or tip 73 of the tube 40, which portion is cut off to attach the hose coupler 42. Venting is important because the large volume of air in the mold creates substantial pressures during the molding process, which, if not released, cause dangerous stress on the mold and accentuate the parting line 34 created by the hatch 66. FIG. 14 shows how the filler tube 40 is formed in, and removed from, the element 70. After the mattress is formed, the venting means 72 are removed by unscrewing and removing the cap 75 and attached tube 77. A vacuum pump (not shown) is attached and air is removed thereby so that the mattress collapses. Once collapsed, the finished mattress is pulled out of the mold through hatch 66. Raw plastic is thereafter introduced into the mold through the hatch 66, the hatch is closed and sealed by the clamps 68, and the forming cycle is again started. After removal of the mattress 22 from the mold, the tip 73 of the filler tube 40 is cut off, the fitting 42 is attached, and the mattress 22 is complete.

Besides its contribution to the manufacture of the seamless article 22, the hatch 66 aids in the fabrication of the mold 60. Combined with the domed portion 62, the hatch enables a person to enter the mold to conduct the finishing operations of permanently sealing together the mold portions 62 and 64. These portions are first aligned and attached, as shown in FIGS. 11–13, and are thereafter welded together along the juncture 74 of the parts 62 and 64. The welding operation is carried out on the inside of the mold and the finished weld is ground smooth, also from the interior of the mold. The effect of this operation is to eliminate the raised ridges of material or parting line that are characterticly formed on products which have been made in two-part molds. If the parting line were not removed, the average consumer would mistake it for a seam; and the mattress, while seamless, could not, as a practical matter, be marketed as a seamless mattress.

While specific embodiments of this invention have been shown, modifications thereof may be made which fall within the spirit and scope of this invention, and it is therefore intended to cover all such embodiments and any such modifications by the appended claims.

What is claimed is:

1. A sheet metal mold for use on a rotational molding machine in a process for the manufacture of a seamless water bed mattress structure capable of containing liquid, said mold comprising:
   a. a first sheet metal portion, said first portion having the shape and proportion of the top half of a water bed mattress and having a domed configuration on the top surface thereof;
   b. a second sheet metal portion peripherally conforming to said first portion and having the shape and proportion of the bottom half of a water bed mattress, said second portion being attached to the first portion to form a hollow enclosure therewith, the juncture of the first and second portions forming a smooth seam in the interior of the enclosure which will not form an objectionable parting line on said liquid-containing structure at the point where the mold portions are joined;
   c. hatch means in one of said portions for providing access to the interior of the mold without separating the two portions of said mold;
   d. means for continuously venting said mold; and
   e. means for attaching said mold to a continuously rotating molding machine.

2. The mold of claim 1 wherein the means for providing access to the interior of the mold is exclusively via the hatch disposed in said first portion, said hatch being much smaller than the surface carrying the hatch.

3. The mold of claim 2 wherein tubular means are provided in the mold for making a tubular protuberance on the molded article which functions as a filling means for the article, and the venting means includes an opening in said mold surface and an elongated tube mounted on a removable cap which is adapted to cover said opening, said tube extending sufficiently into the tubular means in said mold so as to permit air to be released therethrough during the molding process, said tube being so positioned that it will not contact the tubular protuberance formed in the tubular means.

4. The mold of claim 2 wherein the juncture between the mold portion is welded from the inside of the mold and the weld is ground smooth.

5. A sheet metal water bed mattress mold comprising first and second parts which initially come together to form a completely closed cavity having internal contours corresponding to the desired external contours of the water bed mattress, a welded seam ground and polished smooth inside said cavity bonding said first and second parts together, whereby said molded water bed mattress does not include any contour representing an objectional parting line between said mold halves, and hatch means formed in one of said mold parts for enabling access to smooth said welded seam and for introduction of raw material and removal of said molded products.

6. The mold of claim 5 wherein said first and second parts are made of said sheet metal having good heat conductive characteristics and means for strengthening said sheet metal to support said mold for rotation along at least two mutually perpendicular axes.

7. The mold of claim 5 wherein said cavity is substantially an elongated rectangular parallelepiped in the general form, shape and size to mold a water bed mattress, the surface of the mold which forms a side of the mattress that supports a person being domed to provide an excess of molded material when the mattress is lying flat on the side opposing the dome.

8. The mold of claim 7 wherein said mold is made of lightweight material having good heat resistant characteristics and stressed for rotation along two mutually perpendicular intersecting axis.

9. The mold of claim 8 and means comprising a cavity in said mold near a corner of said domed side for forming a threaded spout in said molded water bed mattress.

10. The mold of claim 9 and venting means extending through said mold and into said spout to evacuate air from inside said mold while it is rotating along the two mutually perpendicular axis.

* * * * *

UNITED STATES PATENT OFFICE
CERTIFICATE OF CORRECTION

Patent No. 3,909,178                                Dated  September 30, 1975

Inventor(s)    BENJAMIN ROSS

It is certified that error appears in the above-identified patent and that said Letters Patent are hereby corrected as shown below:

Column 4, line 54, "frim" should be -- firm --

Column 5, line 29, "45" should be -- 46 --

Column 6, line 33, "suitably" should be -- suitable --

Column 8, line 41, in claim 4, line 2, "portion" should be

-- portions --

Signed and Sealed this

*thirtieth* Day of *December 1975*

[SEAL]

Attest:

RUTH C. MASON
*Attesting Officer*

C. MARSHALL DANN
*Commissioner of Patents and Trademarks*